W. SAMUELS.
SLIDE VALVE MECHANISM.
APPLICATION FILED MAR. 26, 1914.
1,273,002.
Patented July 16, 1918.
3 SHEETS—SHEET 2.
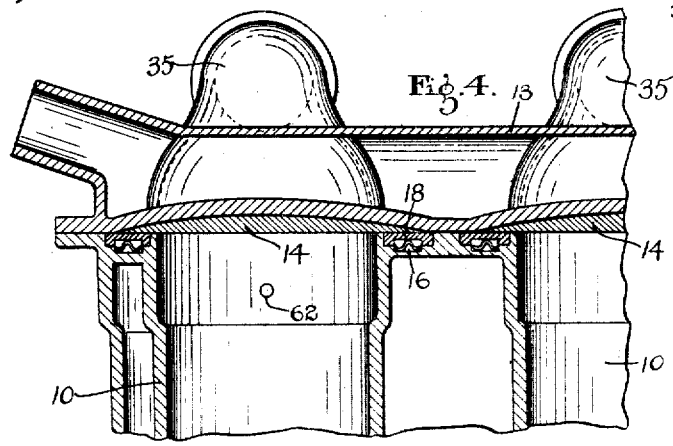
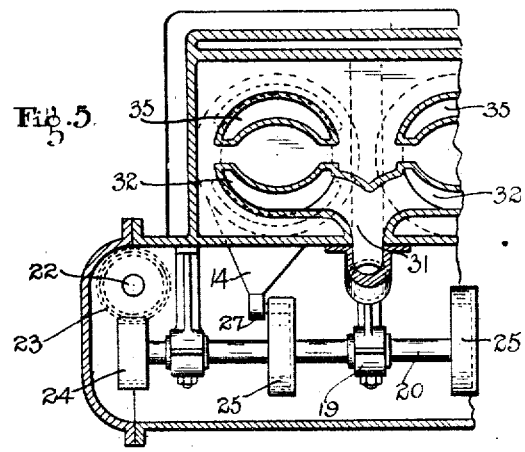
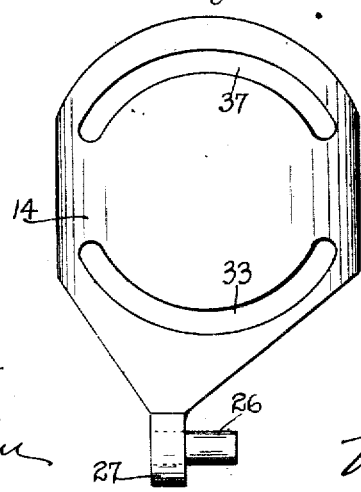
WITNESSES:
INVENTOR
WILHELM SAMUELS.
BY
ATTORNEY

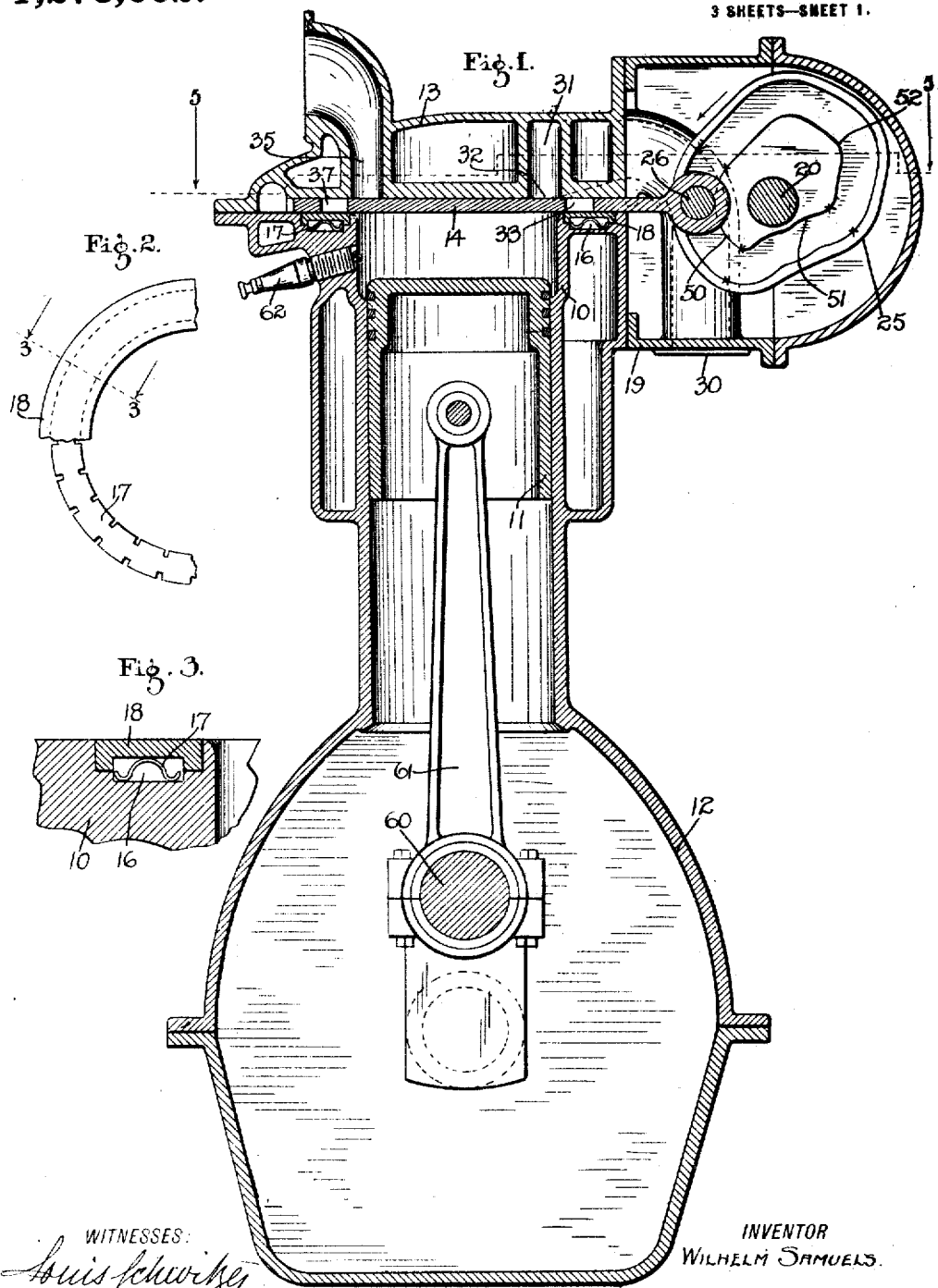

W. SAMUELS.
SLIDE VALVE MECHANISM.
APPLICATION FILED MAR. 26, 1914.

1,273,002.

Patented July 16, 1918.
3 SHEETS—SHEET 3.

WITNESSES:
Louis Schweitzer
O. M. McLaughlin

INVENTOR
WILHELM SAMUELS.
BY
V. H. Lockwood
ATTORNEY

UNITED STATES PATENT OFFICE.

WILHELM SAMUELS, OF INDIANAPOLIS, INDIANA.

SLIDE-VALVE MECHANISM.

1,273,002.

Specification of Letters Patent.

Patented July 16, 1918.

Application filed March 26, 1914. Serial No. 827,409.

*To all whom it may concern:*

Be it known that I, WILHELM SAMUELS, a subject of the Emperor of Germany, and a resident of Indianapolis, county of Marion, and State of Indiana, have invented a certain new and useful Slide-Valve Mechanism; and I do hereby declare that the following is a full, clear, and exact description thereof, reference being had to the accompanying drawings, in which like numerals refer to like parts.

This invention relates to internal combustion engines, preferably of the four cycle type, and the use of a slide valve therein for controlling the intake and exhaust.

The chief feature of the invention is the provision of an engine of said type with a reciprocatory slide valve of relatively light weight and simply operated and arranged so that the gas pressure in the cylinder tends to force the valve against its seat.

In the form shown the slide valve operates within the cylinder or rather across the explosion end thereof and between such explosion end and the cylinder head, and the inner surface thereof is flat and operates against a spring pressed packing ring in the end of the cylinder which prevents leakage of gas.

Along with the foregoing is the provision of a suitable cam on a cam shaft for operating said slide valve and the result is that an extremely simple internal combustion engine is provided. The pressure of the gas holds the valve to its seat and the valve is always stationary when there is a very high degree of pressure, as during the explosion of the gas. When the valve is moving, there is relatively little pressure. During the explosion period the slide ports stand in an opposite position relative to the cylinder head ports, both outside, thus covered and protected by the packing ring, and this enables one to employ only a single slide valve. However, some features of this invention are not limited to the use of a single slide valve.

The full nature of the invention will be understood from the accompanying drawings and the following description and claims.

Figure 7:
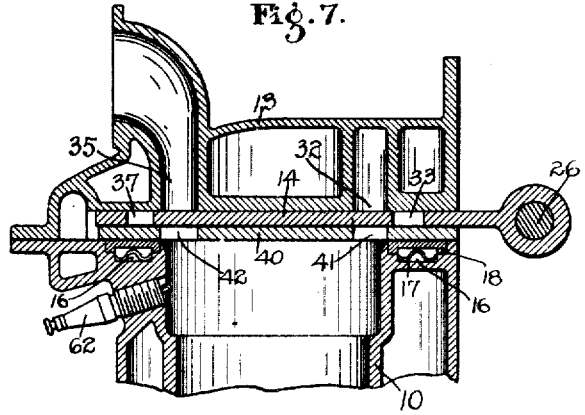
Figure 8:
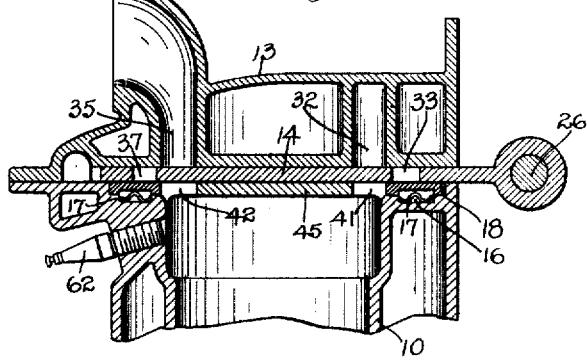
Figure 9:
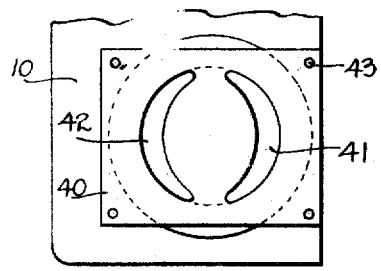

In the drawings, Figure 1 is a central vertical section through an internal combustion engine and showing the parts in their positions at the time of the explosion. Fig. 2 is a plan view of a portion of the packing ring and of the spring beneath it. Fig. 3 is a section through a portion of the cylinder and the packing ring and spring on the line 3—3 of Fig. 2. Fig. 4 is a vertical section through the upper ends of one and a half cylinders and at a right angle to that shown in Fig. 1. Fig. 5 is a section on the line 5—5 of Fig. 1, showing the cylinder heads and associated parts of one and a half cylinders. Fig. 6 is a plan view of the valve. Fig. 7 is a central vertical section through the upper part of the cylinder and its head showing a modified form of the invention. Fig. 8 is similar to Fig. 7, showing another modified form. Fig. 9 is a plan view of the cylinder in Fig. 7, with the cylinder head and valve omitted.

There is shown herein cylinders 10 of an internal combustion engine and a piston 11 for one of said cylinders, each of said cylinders being open at its lower end and in communication with a crank case 12. Between the cylinder head 13 and the main part of the cylinder 10 there is space for a slide valve 14. It, in a sense, closes the explosion end of the cylinder. The end of the cylinder serves as a seat for the inner face of said slide valve, while the inner surface of the cylinder head serves as a seat for the outer surface of said valve.

To prevent leakage of gas between the end of the cylinder 10 and the slide valve 14, the end of the cylinder is provided with an annular recess 16 in which a ring of spring metal 17 lies, said metal being bowed upward transversely to form a spring support for a packing ring 18 which lies upon the spring 17 and substantially is flush with the end surface of the cylinder, and upon said ring 18 the inner slide valve lies and operates. Hence, the inner surface of said valve is plane. The space required for the slide valve is gained by a simple circular cutting operation in the cylinder head. Hence, the outer surface of the slide is convex and of the same curve as the concave inner surface of the cylinder head. 60 is the crank shaft of the engine and 61 the piston rod. 62 is the spark plug.

The pressure of the gas in the cylinder tends to force the slide valve outwardly against its seat in the inner surface of the cylinder head and thus hold it to its seat, and the packing ring 18 follows the valve in any such outward movement or play thereof and maintains a tight joint between the valve and ring to prevent any leakage of gas between the valve and cylinder.

There is a casing 19 attached to the upper end of the cylinder and cylinder head and in it there is an intake 30 through which the fuel gas enters a chamber 31, from a carbureter not shown, and said chamber has a port 32 with which a port 33 in the slide valve 14 is adapted to register at times and thus provide an inlet for the fuel gas to the cylinder. There is an exhaust port 35 with which a port 37 in the slide valve is adapted at times to register. The intake and exhaust ports 33 and 37 of the slide valve 14 are farther apart than the diameter of the explosion end of the cylinder so that at the time of the explosion, see Fig. 1, said ports are closed on their under sides by the packing ring 18 and the slide valve presents a solid surface to the explosion chamber of the cylinder. When the explosion occurs, said slide valve is stationary. Consequently, there is no great wear of said valve since, at the time of extreme pressure, it is stationary. All four valves are crescent-shaped.

The slide valves of the plurality of cylinders are operated from a single cam shaft 20 mounted in the housing 19 and this is driven from the crank shaft of the engine through a shaft 22, see Fig. 5, and gears 23 and 24. The movements of the slide valve are caused and determined by the form of the cams 25 on the cam shaft 29. Said cam has a cam groove into which a pin 26 from a shank 27 of the slide valve 14 projects. Said cam is divided into practically three sections, the surface 50, between two X marks, is the compression and explosion part of the cam, the surface 51 is the exhaust section thereof, and the surface 52 is the intake section. It will be observed that the compression and the explosion section is substantially concentric with the shaft 20 so that the slide valve will stand still. The invention is not limited to the particular location of the ports in the slide valve, nor to the form and direction of movement of the cam 25. Also it is not limited to the use of a cam, but the slide motion may be derived from an eccentric or a special kinematic device, nor to the location of the slide valve, if it be held to its seat by gas pressure in the explosion end of the cylinder.

In the modified form shown in Fig. 7, the cylinder and cylinder head and slide valve are arranged substantially as in the previously described mechanism, excepting that a non-slidable plate 40 is placed between the slide valve 14 and the explosion end of the cylinder, respectively between the slide valve 14 and the packing ring 18. Said plate has ports 41 and 42 adapted to register with the intake and exhaust ports in the valve.

In the operation of this form, the gas pressure still is exerted on the valve as in the previous structure, because of the ports 41 and 42, and the plate 40 is acted upon by the gas pressure, so that it bears against the valve 14, and the packing ring 18 keeps in contact with the plate 40 to prevent leakage. While the plate is free to yield to the gas pressure, four pins 43, see Fig. 9, fastened in the cylinder and fitting in corresponding holes in the plate, prevent any side motion. The advantage of the plate 40 is to protect the slide valve from the explosion fire and facilitate lubrication.

In the modified form shown in Fig. 8, there is a plate 45 corresponding to the plate 40 above, excepting that the plate 55 is rigid with the cylinder, being integral with it but otherwise having the ports 41 and 42. This plate likewise protects the slide valve and does not prevent the pressure of the gas against the slide valve. The packing ring 18 also acts against the slide valve here as it does in the first form described.

The invention claimed is:

1. In an internal combustion four cycle engine, a cylinder open on the explosion end, a cylinder head, and a single slide valve entirely covering with its inner surface the open cylinder end and resting with its outer surface against the cylinder head, the cylinder head having toward the flat cylinder end a recess so as to form together with the latter the chamber for the single slide valve in such a way that said slide chamber has an open outlet to one side from which the single slide valve is actuated and to which it is laterally extended.

2. In an internal combustion engine, a cylinder open on the explosion end, a cylinder head, a slide valve entirely covering with its inner flat surface the open cylinder end, said cylinder having in its otherwise flat explosion end adjacent to the slide valve an annular chamber concentric to the cylinder bore, and a yieldingly supported packing ring in said chamber bearing with a flat surface on the flat inner surface of the slide valve.

3. In an internal combustion engine, a cylinder open on the explosion end, a cylinder head, a single slide valve entirely covering with its inner flat surface the open cylinder end and resting with its outer surface against the cylinder head, said cylinder having in its otherwise flat explosion end adjacent the slide valve an annular chamber concentric to the cylinder bore, and a yieldingly supported packing ring in said chamber bearing with a flat surface on the flat inner surface of the slide valve.

4. In an internal combustion engine, a cylinder open on the explosion end, a cylinder head, a single slide valve entirely covering with its inner flat surface said open cylinder end and resting with its outer surface against the cylinder head, said cylinder having in its otherwise flat explosion end adjacent the slide valve an annular chamber concentric to the cylinder bore, a packing ring in said chamber having a packing contact herewith on both its inner and its outer annular surfaces, and a spring in said chamber tending to press the packing ring with the flat outer surface of the latter against the flat inner surface of the slide valve.

5. In an internal combustion engine, a cylinder having a head with suitable intake and exhaust ports, and a single slide valve located and operating between the cylinder head and the explosion end of the cylinder and having intake and exhaust ports therethrough and adapted to communicate at proper times with the ports in the cylinder head and sufficiently far apart so that at another time they will be closed by the walls of the cylinder.

6. In an internal combustion engine, a cylinder having a head with suitable intake and exhaust ports, a single slide valve located and operating between the cylinder head and the explosion end of the cylinder and having intake and exhaust ports therethrough adapted to communicate at proper times with the ports in the cylinder head, and a spring pressed packing ring mounted in the cylinder and bearing against the inner side of the slide valve, the ports of said slide valve being sufficiently far apart that in one position of said valve they will both be closed by said packing ring.

7. In an internal combustion engine, a cylinder having a head with suitable intake and exhaust ports, and a single slide valve located and operating between the cylinder head and the explosion end of the cylinder and having ports therethrough adapted to communicate at proper times with the ports from the cylinder head, the inner surface of said valve being a plane surface and the outer surface thereof being convex transversely and the inner surface of the cylinder head being concave transversely to serve as a seat for said valve.

In witness whereof, I have hereunto affixed my signature in the presence of the witnesses herein named.

WILHELM SAMUELS.

Witnesses:
 LOUIS SCHWITZER,
 J. H. WELLS.